United States Patent
Carkner

[19]

[11] Patent Number: 6,160,383

[45] Date of Patent: Dec. 12, 2000

[54] INDIRECT CONTACT BATTERY TEMPERATURE DETECTION FOR RECHARGEABLE BATTERY SYSTEM

[75] Inventor: Steven Carkner, Waterloo, Canada

[73] Assignee: Research in Motion Limited, Waterloo, Canada

[21] Appl. No.: 09/347,052

[22] Filed: Jul. 2, 1999

[51] Int. Cl.[7] ........................................ H02J 7/04
[52] U.S. Cl. .................................................. 320/150
[58] Field of Search .............................. 320/150, 151, 320/107

[56] References Cited

U.S. PATENT DOCUMENTS

| | | | |
|---|---|---|---|
| 4,755,735 | 7/1988 | Inakagata | 320/150 |
| 5,497,068 | 3/1996 | Shojima | 320/155 |
| 5,541,496 | 7/1996 | Simmonds | 320/151 |
| 5,548,201 | 9/1994 | Grabon | 320/150 |
| 5,563,494 | 6/1993 | Cuesta et al. | 320/150 |
| 5,583,871 | 12/1996 | Simmonds et al. | 320/151 |
| 5,637,982 | 6/1997 | Nanno et al. | 320/150 |
| 5,767,659 | 6/1998 | Farley | 320/150 |
| 5,795,664 | 8/1998 | Kelly | 320/150 |
| 5,828,203 | 10/1998 | Lindeboom et al. | 320/150 |
| 5,883,492 | 3/1999 | Koenck | 320/107 |
| 5,929,602 | 7/1999 | Suzuki | 320/116 |
| 6,020,721 | 2/2000 | Brotto | 320/150 |

*Primary Examiner*—Peter S. Wong
*Assistant Examiner*—Pia Tibbits
*Attorney, Agent, or Firm*—Jones, Day, Reavis & Pogue; Krishna Pathiyal, Esq.

[57] ABSTRACT

A battery recharging system and method are provided that include a rechargeable battery coupled to a recharging circuit. A recharging operation performed by the recharging circuit is controlled by a temperature measuring system, which is both electrically and thermally coupled to a contact engaging a terminal of the rechargeable battery. The temperature measuring system includes a contact temperature sensor and determination circuit, an ambient temperature sensor and determination circuit, a processing unit, and a threshold value unit. The contact temperature sensor is mechanically isolated from the battery such that the battery can be removed from the apparatus without removing the sensor. The determination circuits output first and second signals to the processing unit. The processing unit determines a difference value between these signals and compares the difference value to a threshold value from the threshold value unit. Based on this comparison, the processing unit sends control signals to the recharging circuit to control the recharging operation.

21 Claims, 2 Drawing Sheets

6,160,383

INDIRECT CONTACT BATTERY TEMPERATURE DETECTION FOR RECHARGEABLE BATTERY SYSTEM

BACKGROUND OF THE INVENTION

The present invention relates to a system and method for recharging a rechargeable battery. More specifically, the present invention relates to a battery recharging system and method using an indirect contact battery temperature sensor, where the system is part of an electronic device, such as a two-way wireless communication device, cellular telephones, pagers, etc.

Such devices may be powered through use of rechargeable batteries. The rechargeable batteries used in these devices typically include NiCd or NiMH cells. There are two conventional ways to determine when these types of cells have finished being recharged. The first way is to compare the temperature of the battery to the ambient temperature. The second way is to detect a drop in voltage that occurs near the end of a charging cycle.

Using the first method, prior art devices monitor the temperature of the cell in comparison to the ambient temperature in another section of the electronic device. When the cell is fully charged, the cell temperature may rise 20 degrees centigrade or more above the ambient temperature, depending on the charging rate. This rise in temperature occurs because once the battery is fully charged, the electrical energy being input into the battery can no longer be converted to chemical energy and stored in the battery. The electrical energy being input into the battery is instead converted to heat energy. Consequently, the battery becomes quite warm, and remains warm as long as the charging continues.

This first method is essentially limited to custom designed battery packs in which a temperature sensor can be placed in physical contact with the cell package. In products that accept AA size (IEC LR6) rechargeable batteries, the ability to place a temperature sensor against the battery is limited since the battery diameters vary and a temperature sensor placed on the wall of the battery compartment does not always contact the battery adequately for thermal conduction.

Using the second method, when the cell is charged from a totally dead state, the cell voltage rapidly rises in the first portion of charging, and then levels out until the cell is almost completely full. At the end of the charging (normally defined as between 110 and 125% of charge) the voltage rises slightly, then dips. This rise and dip near the end of the charging cycle is called "negative-delta-V" because the voltage of the cell has a negative slope, even though energy is being added to it and is caused by various chemical processes inside the cell. Many charging systems detect this drop in voltage and use it to terminate the charging cycle. New NiMH cells exhibit very little negative-delta-V and therefore it is very hard to detect. In addition, if the battery is recharged at the same time a dynamic load is connected, then any increase in the load may cause a decrease in the battery voltage. This would look like a negative-delta-V condition and would cause charging to terminate early.

SUMMARY OF THE INVENTION

According to the present invention, a battery recharging system and method are provided that include a rechargeable battery coupled to a recharging circuit. A recharging operation performed by the recharging circuit is controlled by a temperature measuring system, which is both electrically and thermally coupled to a contact engaging a terminal of the rechargeable battery. In a preferred embodiment of the present invention, the temperature measuring system includes a contact temperature sensor and determination circuit, an ambient temperature sensor and determination circuit, a processing unit, and a threshold value unit. The determination circuits output first and second signals to the processing unit. The processing unit determines a difference value between these signals and compares the difference value to a threshold value from the threshold value unit. Based on this comparison, the processing unit sends control signals to the recharging circuit.

An advantage of the present invention is that an accurate temperature difference between a rechargeable cell, such as a NiCd or a NiMH cell, and the ambient temperature of a device using the battery can be easily detected during recharging of the battery. This is done by detecting the temperature of the battery via a contact sensor thermally coupled to a contact engaging a terminal of the battery.

As will be appreciated, the invention is capable of other embodiments, and its several details are capable of modifications in various respects, all without departing from the invention. Accordingly, the drawings and description of the preferred embodiment are to be regarded as illustrative in nature and not restrictive.

BRIEF DESCRIPTION OF THE DRAWINGS

The present invention will be apparent to those skilled in the art in view of the accompanying drawings, wherein.

DESCRIPTION OF PREFERRED EMBODIMENT

Figure 1:
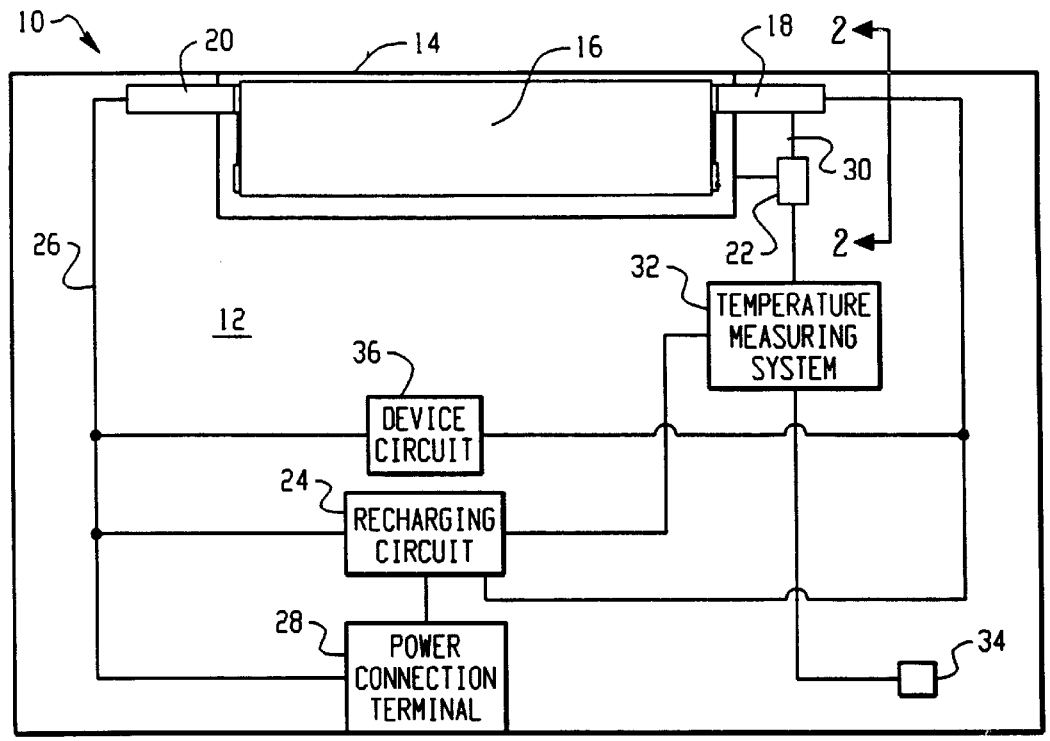
FIG. 1 is a top view of an apparatus comprising a preferred embodiment of the invention.

An apparatus 10 comprising a preferred embodiment of the present invention is shown in FIG. 1. The apparatus 10 is preferably part of an electronic device with a rechargeable battery. An example of such a device is set forth in co-pending U.S. patent application Ser. No. 09/106,585, titled "Hand Held Electronic Device With A Keyboard Optimized For Use With The Thumbs". This application is hereby incorporated into this disclosure by reference. The apparatus 10 includes a printed-circuit-board 12 and a battery compartment section 14 where a battery 16 is held and into which first and second contact structures 18 and 20 extend to engage opposite terminals of the rechargeable battery 16. In accordance with the present invention, there is a contact temperature sensor 22 which is thermally coupled to the first contact 18. Although the temperature sensor 22 is shown thermally coupled to the first contact 18, in alternative embodiments, the temperature sensor 22 may instead be thermally coupled to the second contact 20.

As shown schematically in FIG. 1, a section of the printed-circuit board 12 preferably includes a recharging circuit 24. The contacts 18 and 20 and the recharging circuit 24 are connected through a conducting strip 26 on the circuit-board 12. Preferably, this conducting strip 26 is a layer of copper, although other types of conducting material also could be used. Through this conducting strip 26, the battery 16 is recharged by the recharging circuit 24 in a known manner. Preferably, the recharging circuit 24 is coupled to a power connection terminal 28, which connects the apparatus 10 to an external power source (not shown). In an alternative embodiment of the present invention, the recharging circuit 24 and the external power source is provided via a recharging-type cradle for the device 10 as described in co-pending U.S. patent application Ser. No. 09/343304, titled "Automatic Battery Detection System and Method for Detecting A Rechargeable Battery With Low Remaining Charge". This co-pending application is hereby incorporated into this disclosure by reference.

Figure 2:
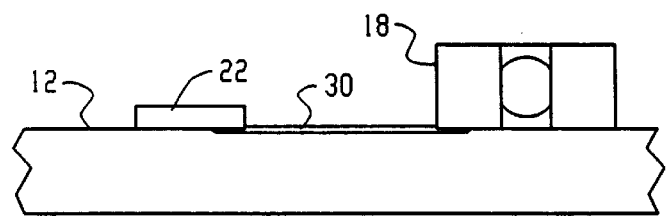
FIG. 2 is a view taken on line 2—2 of FIG. 1.

As is shown in FIGS. 1–2, the contact temperature sensor 22 is thermally coupled to the first contact 18 through a conducting element 30. This conducting element 30 is preferably a copper plate. The contact temperature sensor 22 is preferably soldered to the circuit board 12 so as to be in contact with the copper plate 30. This contact temperature sensor 22 is part of a temperature measuring system 32, which is also attached to the circuit board 12. An ambient temperature sensor 34 is mounted on the circuit board 12 in an area spaced apart from the compartment 14 where the battery 16 is held. The ambient temperature sensor 34 is also part of the temperature measuring system 32.

As further shown schematically in FIG. 1, another section of the printed circuit board 12 includes a device circuit 36, which is discussed in more detail below. In an alternative architecture, the printed-circuit-board 12 may be one or more circuit boards 12 that are electronically coupled, as is known in the art. Further, since the device circuit 36 is connected directly to the battery 16 the impedance of the contact temperature sensor 22 does not impact the operation of the device circuit 36.

In the preferred embodiment, the device circuit 36 is configured to operate as a telecommunications device. The telecommunications device 10 is preferably a wireless transceiver, such as a hand-held two-way communications device, a portable electronic massaging device, or a hand-held email client. The device circuit 36 controls the receipt and transmission of data information, e.g., digitally modulated data, to and from the device 10.

As the battery 16 is nearing full charge, thermal energy leaving the battery 16 flows through the contact 18 and across the copper plate 30 to the contact temperature sensor 22 (FIG. 2). In this configuration, the contact 18 engages the battery 16 for both electrical conduction and thermal conduction. The contact temperature sensor 22 and ambient temperature sensor 34 are preferably variable resistors that change resistance based on temperature, although other sensors could be used, for example a digital sensor, a silicon junction sensor, or an optical sensor.

Figure 3:
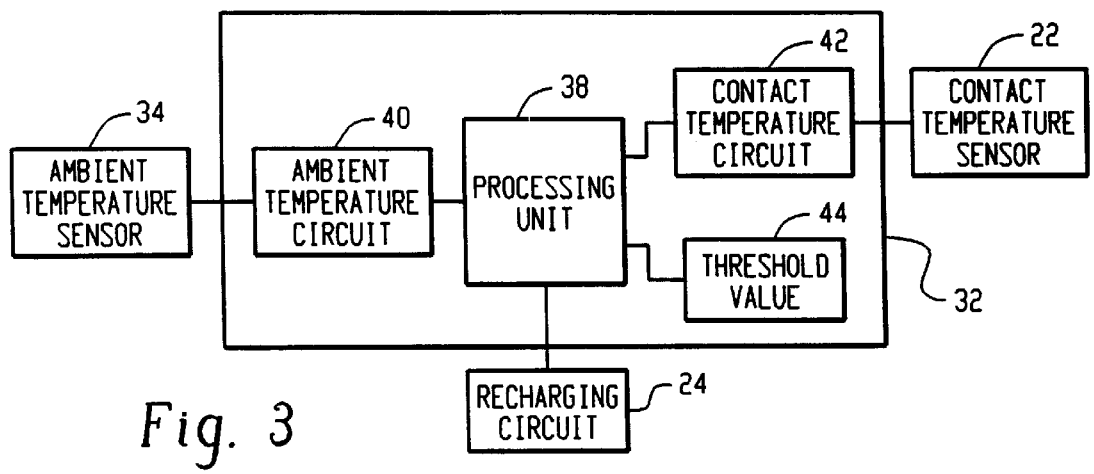
FIG. 3 is a schematic diagram of parts of the preferred embodiment.

As shown in FIG. 3, the temperature measuring system 32 preferably includes a processing unit 38, an ambient temperature determining circuit 40 and a contact temperature determining circuit 42. The contact temperature circuit 42 converts received voltages, currents, or digital signals from the contact temperature sensor 22 into a contact temperature value signal C. The ambient temperature circuit 40 functions similarly to circuit 42, where it converts an electrical or digital value into an ambient temperature value signal A. These signals A and C are then output to the processing unit 38. The processing unit 38 determines a difference value D corresponding to a difference C–A between these received signals, which is compared to a threshold value T input from a threshold value unit 44. Based on this comparison, D to T, the processing unit 38 outputs control signals to the recharging circuit 24 to stop or continue a recharging operation.

Preferably, the processing unit 38 controls the recharging circuit 24 by opening or closing a switch (not shown) in the recharging circuit 24. This discontinues the current and voltage flowing through the recharging circuit 24 to stop the recharging operation.

Figure 4:
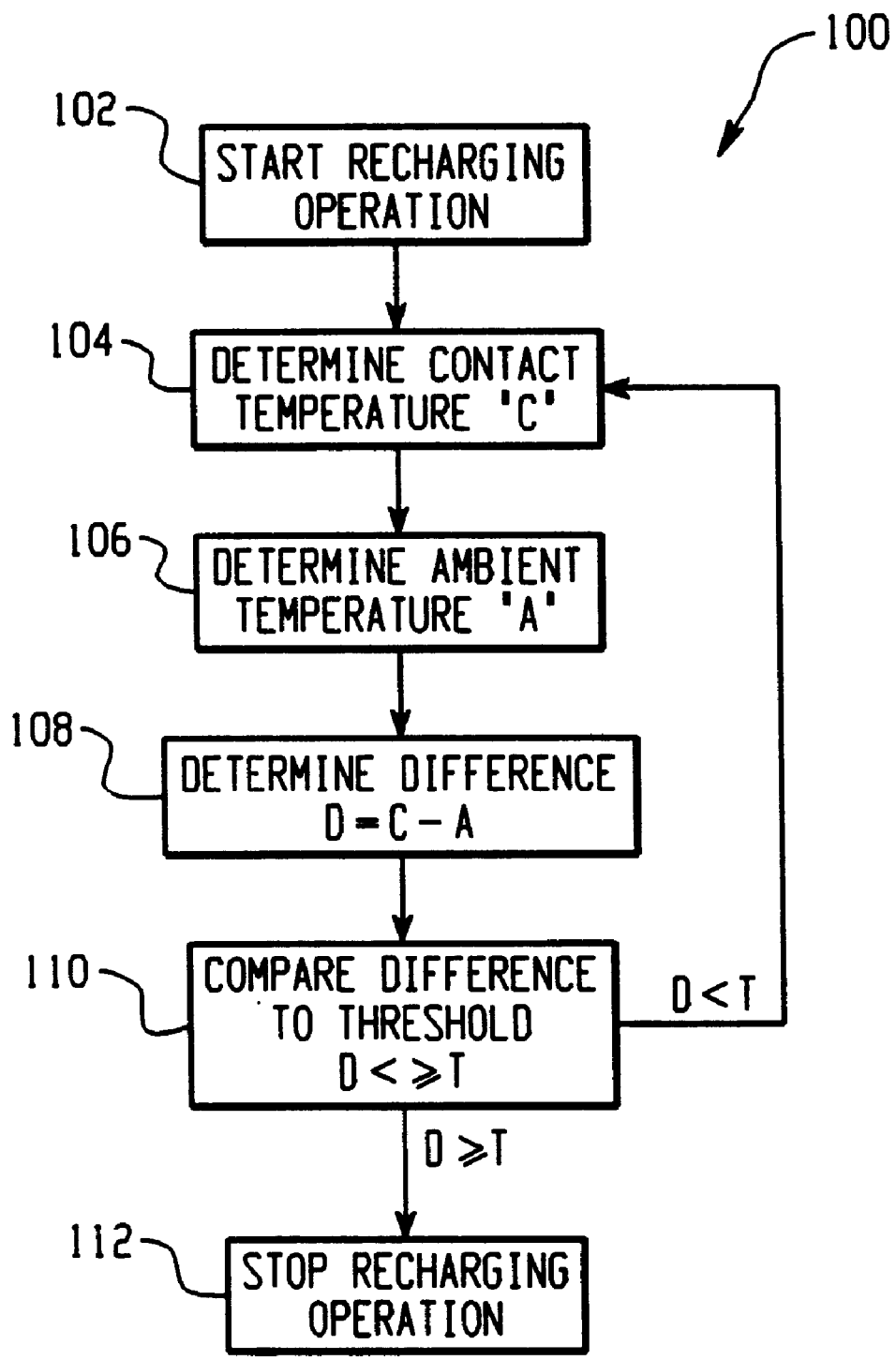
FIG. 4 is a flow chart showing the method of the preferred embodiment.

As shown in FIG. 4, the preferred method 100 of the invention which is used to determine when the processing unit 38 should discontinue the recharging operation starts at step 102. In step 102, the recharging circuit 24 is powered to begin the recharging operation. Next, the temperature signal C of the contact 18 is determined at step 104. Following this, the ambient temperature signal A of the environment in the apparatus 10 is determined at step 106. The difference D=C–A between these two signals is calculated at step 108. This difference D is then compared to a threshold value T at step 110. If the difference D is equal to or greater than the threshold value T, then the recharging operation is stopped at step 112. If the difference D is less than the threshold value T, then steps 104–110 are repeated until the difference D becomes larger than the threshold value T.

The apparatus 10 and method 100 allow for the control of a recharging operation of a NiCd or a NiMH cell either in a user-replaceable general-purpose battery or a customized battery. This is done through the temperature detection of the contact 18 to control the recharging operation. The contact temperature sensor 22 is thermally coupled to the contact 18 outside the section 14 which holds the battery 16. In this arrangement, the contact 18 is used for both electrical and thermal conduction. Thus, accurate temperature readings can be made and compared to the ambient temperature to control the recharging operation.

The invention has been described with reference to preferred embodiments. Those skilled in the art will perceive improvements, changes, and modifications. Such improvements, changes, and modifications are intended to be covered by the appended claims.

I claim:

1. An apparatus, comprising:

a circuit having a recharging section that is operative to recharge a rechargeable battery;

a contact configured to engage a terminal of the rechargeable battery to power the circuit; and a temperature measuring system thermally coupled to the contact and operative to sense a temperature value of the contact, the temperature measuring system further being electrically coupled to the circuit and being operative to control the recharging section of the circuit in response to the temperature value, wherein the temperature measuring system includes a first temperature sensor mechanically coupled to the contact for sensing the temperature value of the contact, the first temperature sensor being mechanically isolated from the battery such that the battery can be removed from the apparatus without removing the first temperature sensor.

2. The apparatus of claim 1, wherein the temperature measuring system further comprises:

a processing unit;

a second temperature sensor which outputs a first signal to the processing unit corresponding to an ambient temperature of the apparatus; and a threshold unit which outputs a threshold value signal to the processing unit;

wherein the first temperature sensor outputs a second signal to the processing unit corresponding to a contact temperature; and wherein the processing unit is operative to determine a difference value corresponding to a difference between the first and second signals to compare the difference value to the threshold value signal such that if the difference value exceeds the threshold value signal the processing unit sends a control signal to the recharging circuit to the recharging circuit to discontinue a recharging operation.

3. The apparatus of claim 1, wherein the contact is mounted on a circuit board and the temperature measuring system is thermally coupled to the contact via a thermally conducting element mounted on the circuit board.

4. The apparatus of claim 1, wherein the circuit is for a wireless two-way communications device.

5. The apparatus of claim 1, wherein the circuit is for a personal digital assistant.

6. The apparatus of claim 1, wherein the circuit is for an integrated e-mail device.

7. An apparatus, comprising:
a contact configured to engage a terminal of a rechargeable battery; and
a temperature measuring system thermally coupled to the contact to sense a temperature value of the contact, wherein the temperature measuring system includes a contact temperature sensor coupled to the contact for sensing the temperature value of the contact, the contact temperature sensor being physically isolated from the battery such that the battery can be removed from the apparatus without removing the contact temperature sensor.

8. The apparatus of claim 7, further comprising:
a housing defining a compartment configured to contain the battery, the temperature measuring system being thermally coupled to the contact at a location outside the compartment.

9. The apparatus of claim 7, wherein the contact is mounted on a circuit board and the temperature measuring system is thermally coupled to the contact via a thermally conducting element mounted on the circuit board.

10. The apparatus of claim 7, wherein the temperature measuring system further comprises:
an ambient temperature sensor; and
a temperature comparing device coupled to the contact and ambient temperature sensors.

11. The apparatus of claim 10, further comprising:
a contact temperature determining device to determine a first signal based on a received temperature value of the contact sensed by the contact temperature sensor, and to output the first signal to the comparing device; and
an ambient temperature determining device to determine a second signal based on an ambient temperature of the apparatus sensed by the ambient temperature sensor, and to output the second signal to the comparing device;
wherein the temperature comparing device determines a difference value between the first and second signals to compare the difference value to a threshold value such that if the difference value is greater than the threshold value the comparing device outputs a corresponding control signal.

12. The apparatus of claim 11, further comprising a recharging circuit to perform a recharging operation on the battery and which is responsive to the control signal to discontinue the recharging operation.

13. A method, comprising the steps of:
operating a temperature measuring system to measure a temperature value of a contact, the contact engaging a terminal of a rechargeable battery during a recharging operation to create a dual-purpose electrical and thermal conduction path allowing for both electricity and heat in the battery to flow through the battery terminal to the contact; and
controlling the recharging operation based on the difference between the contact temperature value and an ambient temperature value.

14. The method of claim 13, further comprising the step of measuring the temperature value of the contact at a location outside a battery compartment which holds the rechargeable battery.

15. The method of claim 14, wherein the contact temperature value is measured via a conducting element which thermally couple the temperature measuring system to the contact.

16. The method of claim 15, wherein the controlling step comprises the steps of comparing a difference value, corresponding to a difference between a contact temperature value signal and an ambient temperature value signal, to a threshold value such that if the difference value is greater than the threshold value the recharging operation is discontinued.

17. A recharging circuit control system for controlling a recharging operation of a rechargeable battery in a hand-held wireless two-way communications device, the system comprising:
wireless communications circuitry;
a recharging circuit;
a processing unit;
a threshold value unit that outputs a threshold value to the processing unit;
a contact temperature sensor that senses a temperature of a contact that engages a terminal of the rechargeable battery and outputs a contact temperature value to a contact temperature determination device which converts the contact temperature value to a first temperature signal and outputs the first temperature signal to the processing unit, wherein the contact temperature sensor is coupled to the contact and mechanically isolated from the rechargeable battery; and
an ambient temperature sensor that measures an ambient temperature of the device and outputs an ambient temperature value to an ambient temperature determination device which converts the ambient temperature value to a second temperature signal and outputs the second temperature signal to the processing unit;
wherein the processing unit determines a difference value between the first and second temperature signals and compares the difference value to the threshold value such that if the difference value is above the threshold value the processing unit outputs a control signal to the recharging circuit to discontinue the recharging operation.

18. A method for controlling a recharging operation of a rechargeable battery in a portable electronic device, the method comprising the steps of:
a) initiating the recharging operation;
b) determining a contact temperature of a contact engaging a terminal of the rechargeable battery using a temperature sensor that is coupled to the contact and mechanically isolated from the rechargeable battery and outputting a first temperature signal;
c) determining an ambient temperature in the portable electronic device and outputting a second temperature signal;

d) determining a difference value between the first and second temperature signals; and
e) comparing the difference value to a threshold value, wherein:
  e1) if the difference value is above the threshold value, the recharging operating stopped; and
  e2) if the difference value is below the threshold value, the steps (b) through (e) are repeated until the difference value is above the threshold value.

19. The method of claim 18, wherein the electronic device is a wireless two-way communications device.

20. The method of claim 18, wherein the electronic device is a personal digital assistant.

21. The method of claim 18, wherein the electronic device is an integrated e-mail device.

* * * * *